(12) United States Patent
Brandt (10) Patent No.: US 7,773,829 B1
(45) Date of Patent: Aug. 10, 2010

(54) IMAGE-CENTRIC RULERS

(75) Inventor: Jonathan W Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 978 days.

(21) Appl. No.: 11/351,509

(22) Filed: Feb. 10, 2006

(51) Int. Cl.
G06K 9/00 (2006.01)
G06K 9/36 (2006.01)
G06K 9/32 (2006.01)
B43L 7/00 (2006.01)
G01B 3/12 (2006.01)
G01B 5/04 (2006.01)

(52) U.S. Cl. ............... 382/294; 382/100; 382/286; 382/293; 382/296; 33/494; 33/735

(58) Field of Classification Search ............... None
See application file for complete search history.

(56) References Cited

U.S. PATENT DOCUMENTS

| | | | | |
|---|---|---|---|---|
| 5,790,435 A | * | 8/1998 | Lewis et al. ............ | 716/6 |
| 5,867,273 A | * | 2/1999 | Corby, Jr. .............. | 356/613 |
| 5,986,662 A | * | 11/1999 | Argiro et al. ........... | 345/424 |
| 6,144,974 A | * | 11/2000 | Gartland ............... | 715/205 |
| 6,334,063 B1 | * | 12/2001 | Charlier et al. ......... | 455/566 |
| 6,792,071 B2 | | 9/2004 | Dewaele | |
| 6,907,565 B1 | | 6/2005 | Huang | |
| 2003/0095710 A1 | * | 5/2003 | Tessadro ............... | 382/199 |
| 2004/0096098 A1 | * | 5/2004 | Love ................... | 382/154 |
| 2005/0049509 A1 | * | 3/2005 | Mansour et al. ......... | 600/476 |
| 2005/0134928 A1 | | 6/2005 | Schmitz et al. | |
| 2005/0162445 A1 | | 7/2005 | Sheasby et al. | |
| 2005/0196042 A1 | * | 9/2005 | Gehrig et al. .......... | 382/175 |
| 2006/0008779 A1 | * | 1/2006 | Shand et al. ........... | 434/90 |

* cited by examiner

*Primary Examiner*—Vikkram Bali
*Assistant Examiner*—Michelle Entezari
(74) *Attorney, Agent, or Firm*—Robert C. Kowert; Meyertons, Hood, Kivlin, Kowert & Goetzel, P.C.

(57) ABSTRACT

Image-centric rulers are described, including a method comprising detecting a position of a pointer relative to an image, drawing a ruler extending outward approximately from the position of the pointer, and moving the ruler in response to detecting a movement of the pointer.

19 Claims, 10 Drawing Sheets

IMAGE-CENTRIC RULERS

FIELD OF THE INVENTION

The present invention relates generally to software. More specifically, image-centric rulers are described.

BACKGROUND OF THE INVENTION

Computer systems typically output visual information to display screens such as cathode ray tube (CRT) monitors or liquid crystal displays (LCDs). A display is made up of a grid of picture elements, or pixels, each of which has a color value associated with it. This grid of pixels is a two-dimensional rectangular grid along an x-axis and a y-axis. A graphical image is a set of pixels that has a dimensions (typically a height and a width), expressed in pixels, and locations and color values for each of those pixels. A graphical image may be stored in a file (or other data structure) and be displayed in whole or in part on a subset of or the whole display screen.

Imaging software, such as Photoshop® by Adobe Systems Incorporated of San Jose, Calif., is a type of software used to view or manipulate graphical images. Imaging software is typically presented in a windowed graphical user interface (GUI) environment on a computer system display. Imaging software displays a graphical image that can then be manipulated by a user. Some types of manipulations that a user may perform include transformations such as panning the image (if the image is too large to display on the display screen), zooming in to and out of the image, and rotating the image.

Imaging software may display an image within a window on the display. Oftentimes the window includes rulers along its edges to allow a user to determine how large the image is and where certain features are located within the image. The rulers can be especially useful when the image is zoomed and the entire image is not visible.

Some users rotate an image when manipulating it to ease manipulation. For example, some users prefer to align the image they are working on with their elbow to improve their ability to create or modify the image. When the image is rotated in this fashion, the user is unable to use rulers on the edge of the image window, because the rotated image is no longer aligned with the edges of the window. Additionally, when the image is zoomed in, the user is unable to determine the location of features within the image.

Thus, what is needed is a ruler without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, the operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to embodiments of the invention, an image is displayed on a display. The image may then be rotated or otherwise transformed by a user. A position of a pointer (for example, a mouse pointer) is detected relative to the image. A ruler extending outward approximately from the position of the pointer is drawn over the image. The ruler indicates measurement of the image in a format that may be specified by the user or by the application. The ruler may take one of several forms, such as two segments at a fixed angle (e.g., perpendicular) to each other and relative to the edges of the image. When the image is further transformed, the ruler can be transformed along with the image to indicate to a user the position of elements of the image. The ruler additionally may follow the pointer about the image when the pointer is moved by the user.

An Exemplary Computer System and Graphics Processing Unit

Figure 1:
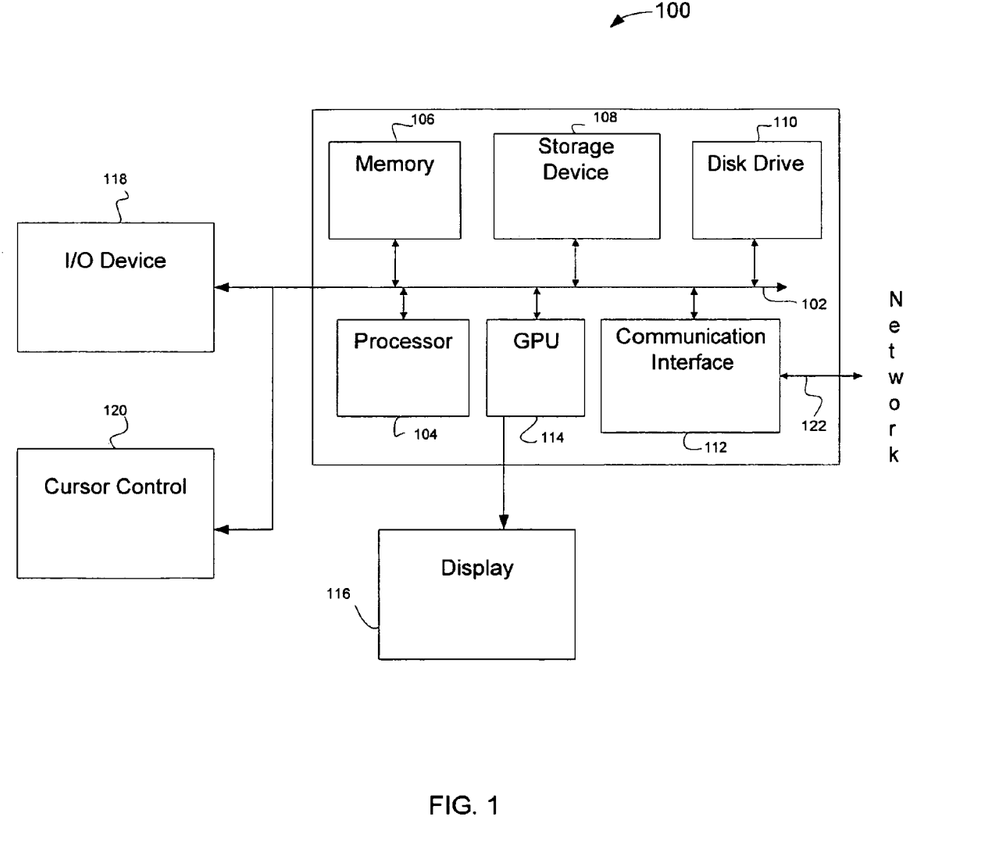
FIG. 1 is a block diagram illustrating an exemplary computer system suitable for generating image-centric rulers, in accordance with various embodiments.

FIG. 1 is a block diagram illustrating an exemplary computer system suitable for generating image-centric rulers, in accordance with various embodiments. In some embodiments, a computer system 100 may be used to implement computer programs, applications, methods, processes, or other software to perform the above-described techniques. The computer system 100 includes a bus 102 or other communication mechanism for communicating information, which interconnects subsystems and devices, such as a processor 104, a system memory 106 (e.g., RAM), a storage device 108 (e.g., ROM), a disk drive 110 (e.g., magnetic or optical), a communication interface 112 (e.g., modem or Ethernet card), a graphics processing unit (GPU) 114, a display 116 (e.g., CRT or LCD), an input device 118 (e.g., keyboard), and a cursor control 120 (e.g., mouse or trackball). The display 116 may also be connected to the computer system 100 through the GPU 114.

According to some embodiments of the invention, the computer system 100 performs specific operations by processor 104 executing one or more sequences of one or more instructions stored in the system memory 106. Such instructions may be read into the system memory 106 from another computer readable medium, such as the static storage device 108 or the disk drive 110. In some embodiments, hard-wired circuitry may be used in place of or in combination with software instructions to implement the invention.

The GPU 114 performs graphics processing that otherwise would be completed using various software routines run on the processor 104. For example, the GPU 114 can draw polygons and lines, perform blending to change the appearance of certain graphical features, and transform graphical objects using native functions. The GPU 114 improves overall system and graphics performance by executing these functions (e.g., standard OpenGL or Direct3D function calls) in hardware rather than in software. Using these standard functions can also simplify the implementation of the processes described below. According to certain embodiments of the invention, however, software emulation of the OpenGL or Direct3D functions may be used rather than using a dedicated GPU. Certain embodiments of the invention describe specific OpenGL functions, however, it is understood that equivalent Direct3D or other functions may also be used in their place. The GPU 114 may be one of those manufactured by nVidia of Santa Clara, Calif. or ATI of Markham, Ontario, Canada.

Image Coordinates and Screen Coordinates

According to some embodiments, an image is displayed on a display. As is used herein, the term "display" may refer to the display area of a physical screen such as a cathode ray tube (CRT) or liquid crystal display (LCD). For example, a display may be a grid of 1024 pixels by 768 pixels in which an image can be displayed.

The display has a fixed coordinate system which is hereinafter referred to as screen coordinates. According to an embodiment, the screen coordinates have an origin (i.e., the coordinates (0,0)) at one corner of the display. Screen coordinates may indicate a physical position on the display. For example, the screen coordinates (512, 384) are the center of the example display discussed above.

The image may also be implemented with a fixed coordinate system referred to as image coordinates, which have an origin at a corner of the image. An image drawn on a display can be transformed (e.g., rotated, panned, zoomed) relative to the display. As a result, the relationship between image coordinates and screen coordinates changes based on the current transformation of the image. The GPU 114 may include functions to convert image coordinates to screen coordinates for display. These functions may be used in various embodiments, although it is understood that a GPU is not required to perform these embodiments.

Although some embodiments described below describe functions that use image coordinates, it is understood that since image coordinates are related to screen coordinates, the processes described below may also be performed using screen coordinates.

An Image-Centric Ruler

FIGS. 2A-2D illustrate different views and different embodiments of image-centric rulers. An "image-centric" ruler is one that is oriented to an image rather than a display. Therefore, according to an embodiment, an image-centric ruler may be drawn in image coordinates rather than screen coordinates. An image-centric ruler may be used to measure an image that has been transformed relative to a display. Image-centric rulers may be drawn over the image in some embodiments. Processes for drawing image-centric rulers such as those shown here are described in FIGS. 4A-4B.

Figure 2A:
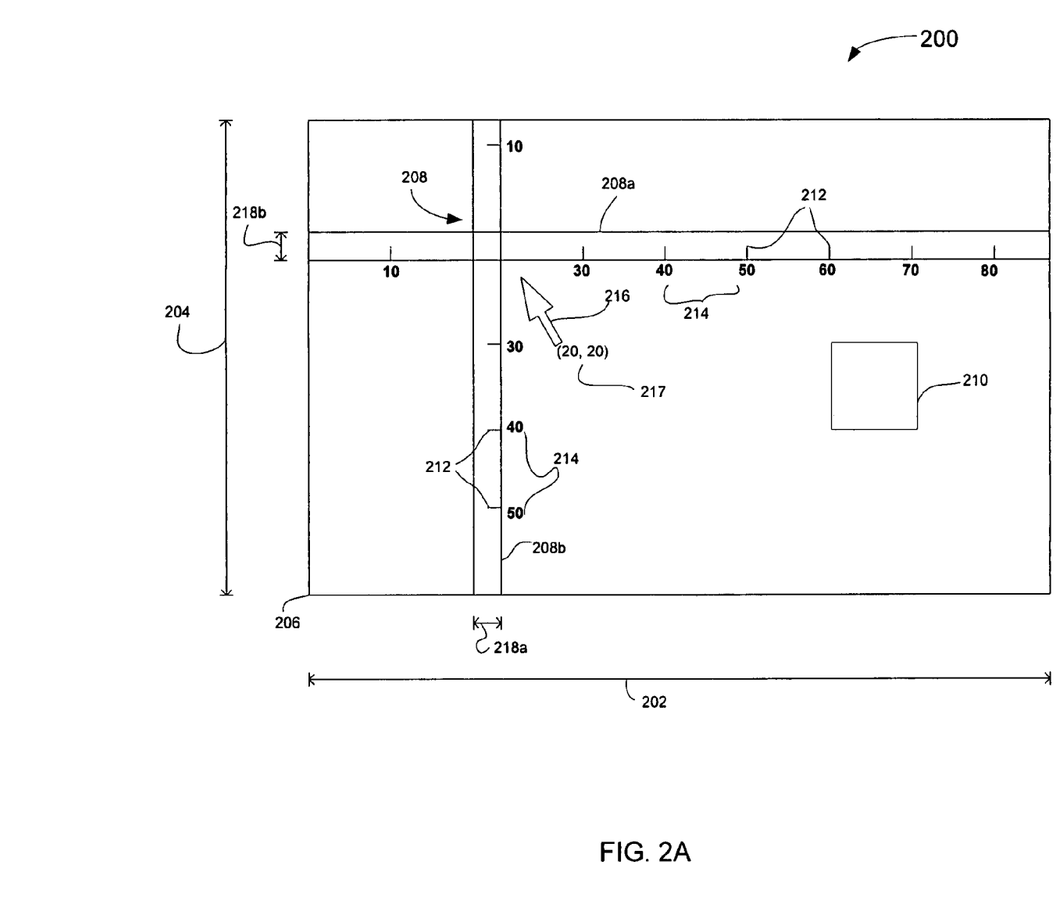
FIG. 2A illustrates an image-centric ruler according to an embodiment.

FIG. 2A illustrates an image-centric ruler according to an embodiment. An image 200 may be a bitmapped image including a grid of pixels that has positional values represented along an x-axis 202 and a y-axis 204. For example, an origin 206 of the image 200 may have the value (0,0), and the x and y values of the pixels increase as they move rightward and upward, respectively. Alternatively, the image 200 may also be any type of image, such as a vectorized image, and distances may be measured using any reference units, such as distance from the origin, etc.

A ruler 208 includes two segments 208a and 208b which are parallel to the x-axis 202 and the y-axis 204 respectively. Alternatively, a ruler 208 may be drawn that is at fixed orientation (e.g., at some angle to the x-axis 202 and/or the y-axis 204) relative to the image 200. Tick marks 212 and reference numbers 214 are drawn on or near the ruler 208. The reference numbers 214 are drawn near the tick marks 212 to indicate positions of the tick marks 212 relative to the image 200. The ruler 208 may be used to judge relative positions of elements within the image 200. For example, the approximate location of an object depicted within the image 200 such as a box 210 can be determined by consulting the tick marks 212 and the reference numbers 214 on the ruler 208.

The tick marks 212 are shown here as a short line within the ruler 208 and the reference numbers 214 are shown near the ruler 208. It is understood that the tick marks 212 and the reference numbers 214 may have various other appearances, and may be located anywhere near the ruler 208. Further, as will be explained below regarding FIG. 4A, the distance between the tick marks 212 may be calculated so that it appears constant on the display (i.e., constant in screen coordinates), regardless of zoom. Additionally, the reference numbers 214 may change as the image is zoomed in and out. For example, the reference numbers 214 may revert to a smaller scale (e.g., 2, 4, 6, 8 rather than 20, 40, 60, 80) as the image 200 is zoomed in.

A pointer 216 is controlled by the cursor control 120. The pointer 216 is a type of cursor that may be controlled by a mouse or other pointing device. The ruler 208 is drawn relative to the position of the pointer 216. The ruler 208 may be drawn at or near the pointer 216 so that a user can choose the position of the ruler 208 using the cursor control 120. The intersection of the two segments 208a and 208b generally follows the position of the pointer 216. When movement of the pointer 216 is detected, the ruler 208 is redrawn near the pointer 216. According to an embodiment, the side of each of the segments 208a and 208b on which the tick marks 212 are located is closest to the pointer 216. This is discussed further regarding FIG. 2B. A pointer position indicator 217 may also be drawn near the pointer 216 to indicate the exact position of the pointer 216 in image coordinates. This may be useful when a user is trying to determine the location of a feature within the image 200.

The ruler 208 may have several user- or application-defined specifications. For example, a width 218a of the first segment 208a and a width 218b of the second segment 208b may be specified in screen coordinates so that the width of the ruler 208 appears constant regardless of the zoom of the image 200. This is explained further regarding FIGS. 4A and 4B. According to other embodiments, the appearance of the ruler 208 may be changed. For example, the opacity of the ruler 208 may be varied so that the portion of the image 200 covered by the ruler 208 is partially visible. Additionally, the ruler 208 may use more or fewer segments and may have different visual forms (see, e.g., FIG. 2D).

Figure 2B:
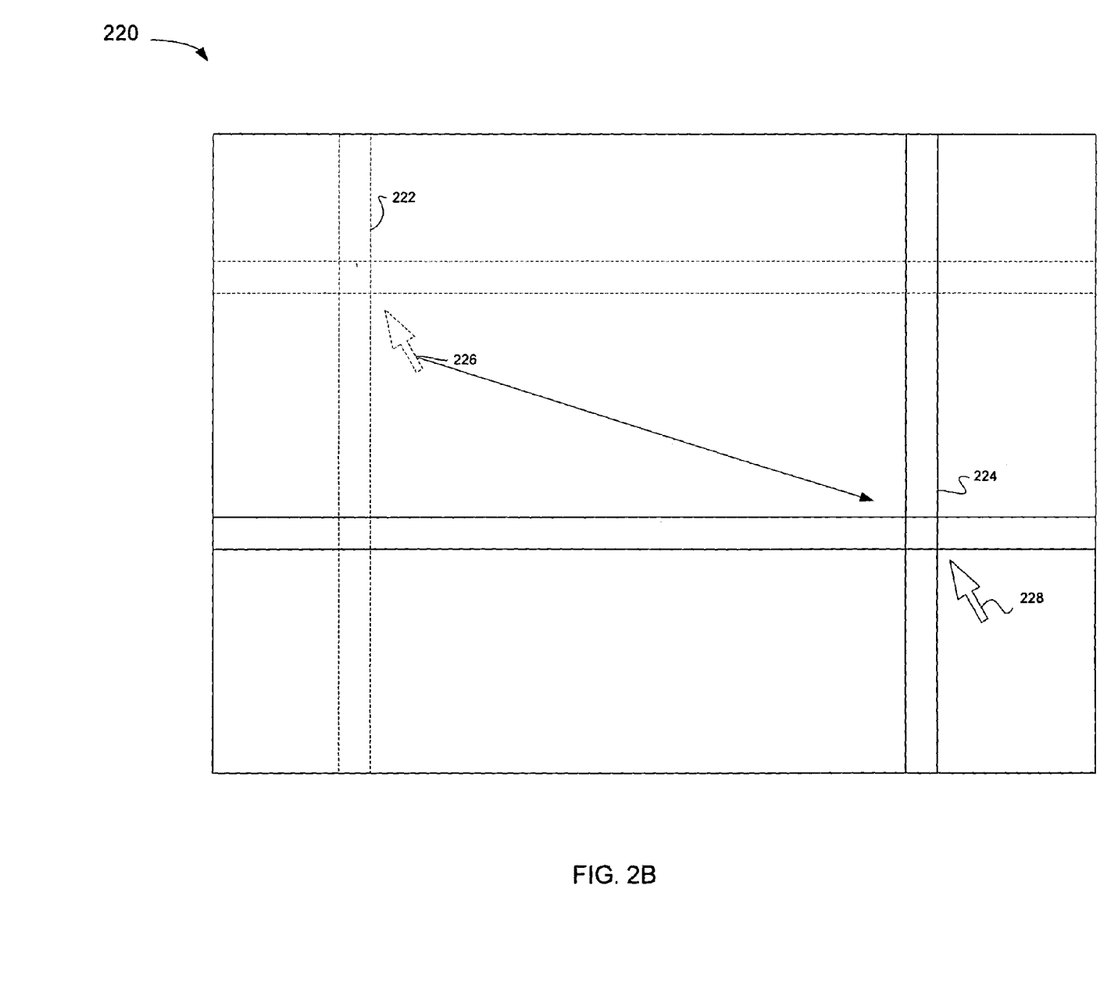
FIG. 2B illustrates movement of an image-centric ruler according to an embodiment.

FIG. 2B illustrates movement of an image-centric ruler according to an embodiment. An image 220 is drawn on a display. Two rulers, a first ruler 222 and a second ruler 224, are shown. The first ruler 222 is drawn near a pointer 226. When the pointer 226 moves to a new position and becomes the pointer 228, the first ruler 222 is redrawn to become the second ruler 224. The ruler is continuously redrawn as the pointer navigates about the image 220, allowing a user to position the ruler anywhere they wish.

Figure 2C:
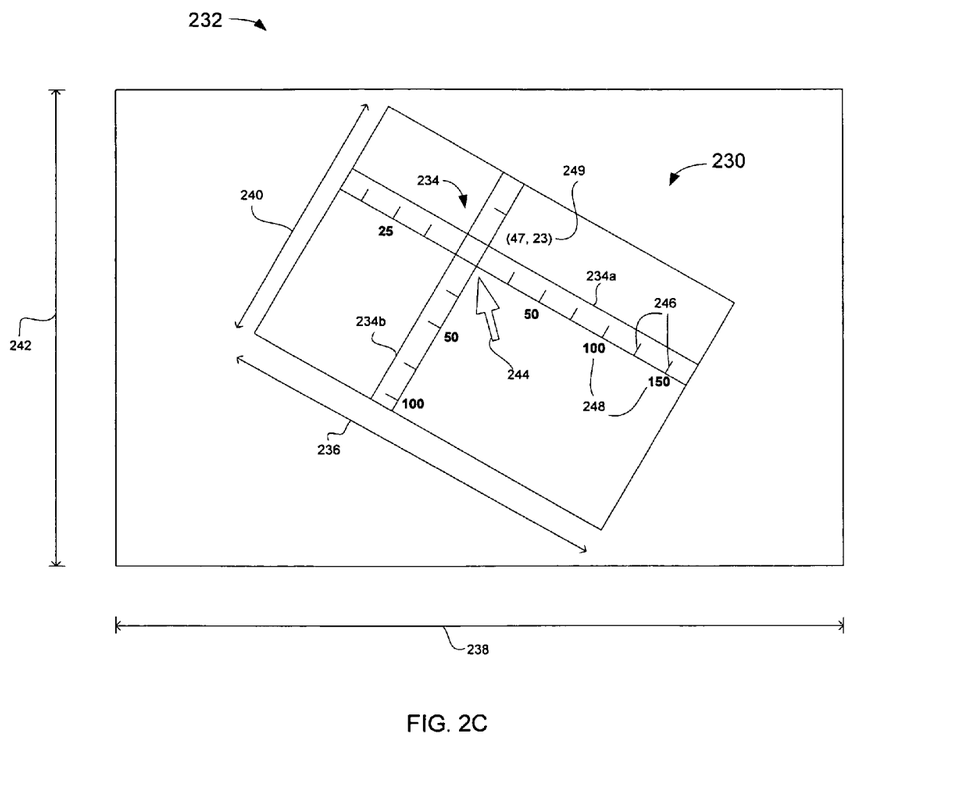
FIG. 2C illustrates a transformed image on a display including an image-centric ruler according to an embodiment.

FIG. 2C illustrates a transformed image on a display including an image-centric ruler according to an embodiment. An image 230 has been rotated relative to a display 232. As mentioned above, users of imaging software may rotate the image 230 to ease modification of the image 230. A ruler 234 superimposed on the image 230 is also rotated when the image 230 is rotated. For example, a first segment 234a of the ruler 234 is parallel to an x-axis 236 of the image 230, which is rotated relative to an x-axis 238 of the display 232. Likewise, the second segment 234b of the ruler 234 is parallel to a y-axis 240 of the image 230, which is rotated relative to a y-axis 242 of the display 232. In the embodiment shown here, the segments 234a and 234b are always parallel to the x-axis 236 and the y-axis 240, respectively, regardless of the current transformation of the image 230. However, alternative embodiments of the ruler 234 may not-necessarily be parallel to the axes of the image 230, and the ruler 234 does not necessarily rotate the same amount that the image 230 does.

As was the case with the ruler 208, the ruler 234 is drawn extending outward approximately from a pointer 244. In this context, "approximately" refers to at or near the pointer 244, and may refer to drawing the ruler 234 outward from a position of the pointer 244 or offset from the ruler 234 by some amount. The ruler 234 also includes tick marks 246 on or near the ruler 234, reference numbers 248, and a pointer position indicator 249 similar to those described above regarding FIG. 2A.

Image rotation also allows a user to take advantage of certain axis-aligned tools, such as a rectangle-drawing tool. Axis-aligned tools are used aligned to the axes of the display. Some users may want to draw rotated rectangles on the image 230, for example. These users could rotate the image 230, and draw the rectangle on the rotated image. Since the tool is aligned to the display's 232 axes, the rectangles are drawn at an angle with respect to the image. The ruler 234 allows the user to determine where the rectangle is being drawn in image coordinates.

Figure 2D:
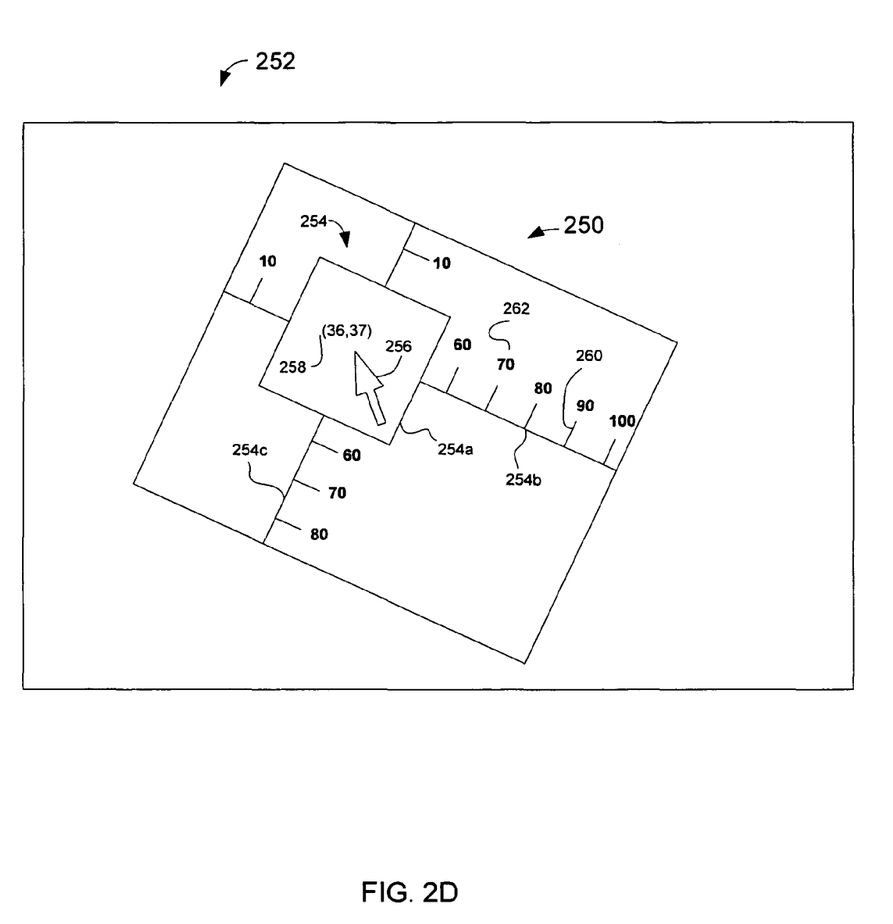
FIG. 2D illustrates an alternative embodiment of an image-centric ruler.

FIG. 2D illustrates an alternative embodiment of an image-centric ruler. An image 250 is displayed on a display 252. Superimposed on the image 250 is a ruler 254 that includes a box 254a and two segments 254b and 254c extending outward from the box 254a. The box 254a allows a user to see the portion of the image near a pointer 256, without the ruler 254 interfering. A pointer position indicator 258 shows the location of the pointer 256 in image coordinates. The ruler 254 also includes tick marks 260 and reference numbers 262. Like the first embodiment as shown in FIGS. 2B and 2C, the image 250 may be further transformed relative to the display 252, and the ruler 254 is transformed along with the image 250 and continues to measure the image 250 in image coordinates.

Alternatives of the ruler 254 may substitute other shapes, such as a circle in place of the box 254a. Further, the box 254a may include a grid or other orientation tool to help a user determine locations of features within the box 254a.

Image-Oriented Ruler Tick Marks

Figure 3A:
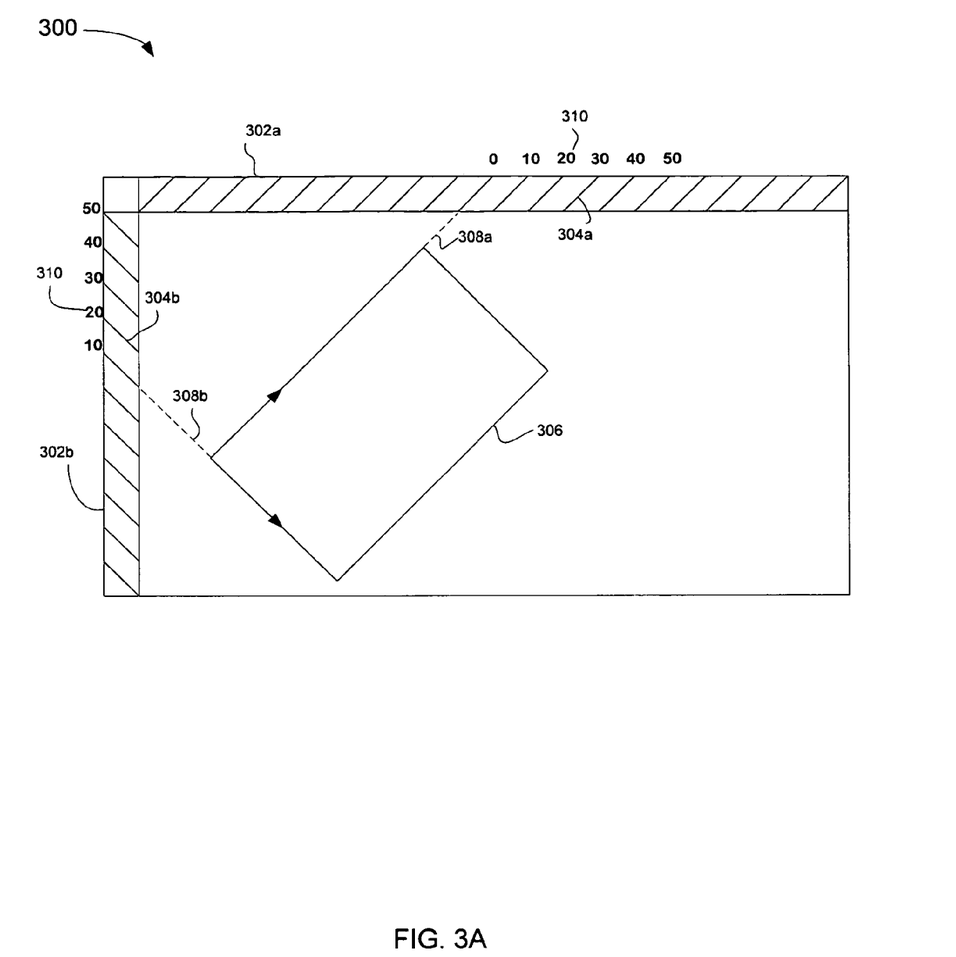
FIGS. 3A and 3B illustrate a ruler using tick marks that follow the orientation of an image according to an embodiment.
Figure 3B:
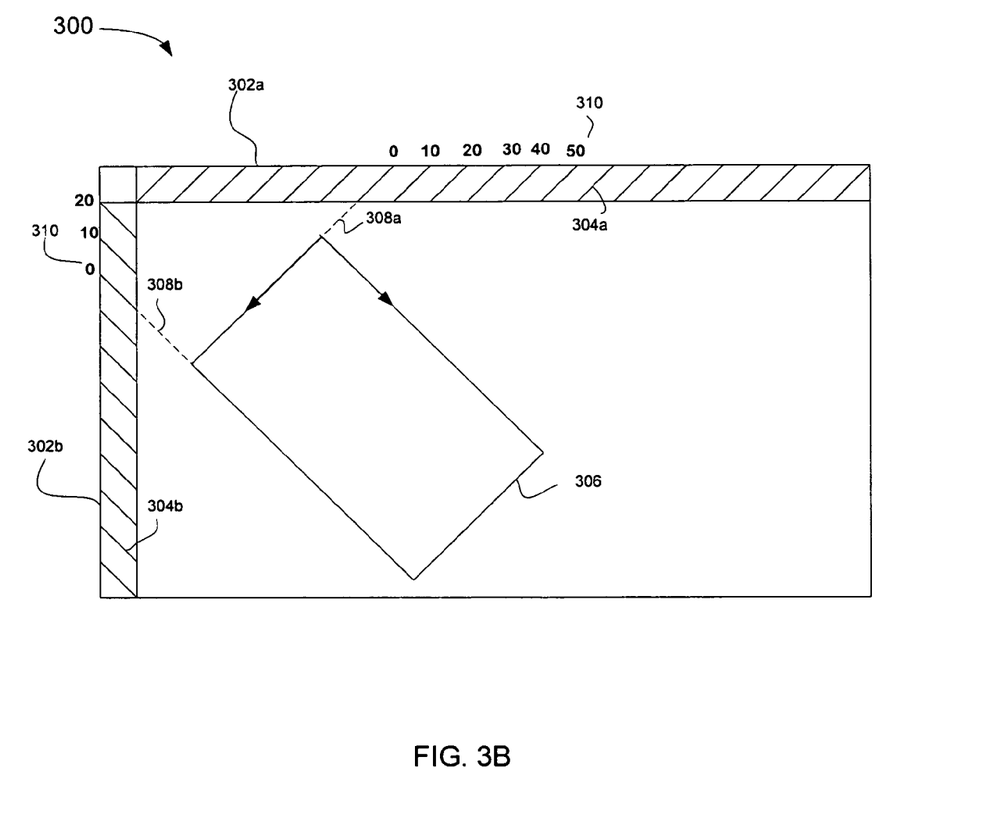

FIGS. 3A and 3B illustrate a ruler using tick marks that follow the orientation of an image according to an embodiment. A display 300 has two rulers 302a and 302b drawn at its edges. Although a display 300 is shown, the rulers 302a and 302b could also be located at the edges of a subset of a display such as a window. The rulers 302a and 302b include several tick marks 304a and 304b, respectively, which measure the relative position of pixels and features within an image 306. The image 306 is also transformable (e.g., rotatable) with respect to the display 300.

The tick marks 304a and 304b rotate when the image 306 is rotated to indicate the rotation of the image 306. As shown in FIG. 3A, the tick marks 304a are aligned (i.e., parallel) with the y-axis 308a of the image 306, and the tick marks 304b are aligned with the x-axis 308b of the image 306. As shown in FIG. 3B, the image 306 is rotated 90 degrees clockwise further than it is in FIG. 3A. In this instance, the tick marks 304a are aligned with the x-axis 308b of the image 306 and the tick marks 304b are aligned with the y-axis 308a of the image 306. According to another embodiment, color or some other indication on the rulers 302a and 302b can inform the user which image of the axes 308a or 308b is aligned to the tick marks 304a or 304b on the given ruler 302a or 302b.

Using these embodiments, the rulers 302a and 302b have the same orientation to the image 300 regardless of the position of the image 306. The tick marks 304a and 304b indicating the measurement of the pixels of the image 306 are orientated to the image 306. Reference numbers 310, which measure the pixels in the image 306, may also change to indicate a changing position of the image 306 relative to the display 300. For example, the image 306 may be panned to another location within the display 300, or may be rotated with respect to the display 300, which would require a change in the reference numbers 310.

Processes for Drawing Rulers

Figure 4A:
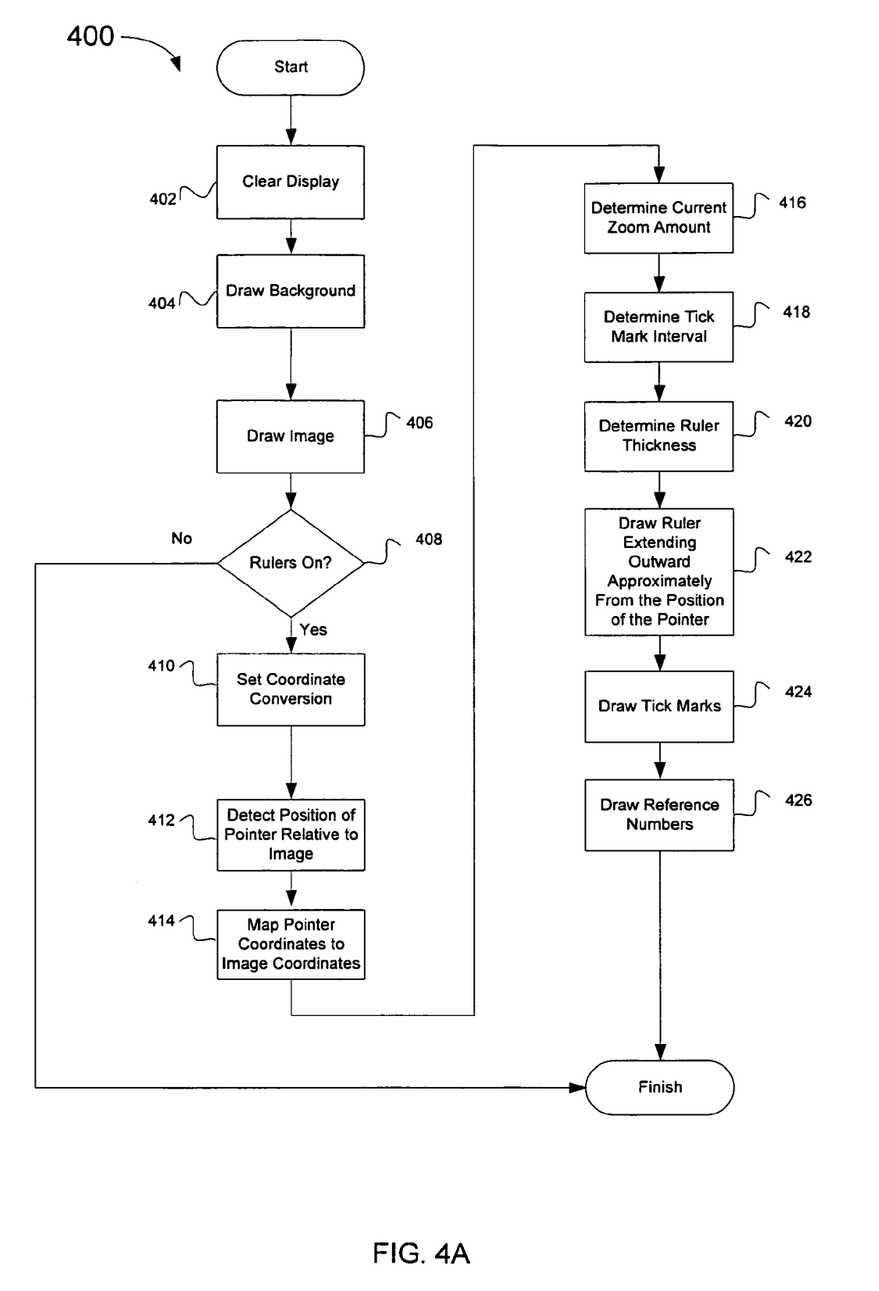
FIG. 4A is a flowchart describing a' process for drawing image-centric rulers according to an embodiment.

FIG. 4A is a flowchart describing a process 400 for drawing image-centric rulers according to an embodiment. The process 400 can be used to draw rulers such as the rulers 208 and 234 shown in FIGS. 2A and 2C. The following description of the process 400 mentions several specific hardware and/or software functions. It is understood, however, that various other functions may be used to draw rulers according to various embodiments of the invention. Further, a specific process is described in which certain operations may be changed or removed depending on the desires of the user and the needs of the specific application.

In block 402 the display is cleared. Clearing the display generally refers to removing any image or other graphical data currently drawn on the display. In block 404, a background for the display is drawn. In block 406, the image is drawn on the display. When the image is drawn, the various transformations that have been performed on the image are taken into account. For example, a user may have rotated, panned, zoomed, etc. the image, all of which would be shown when the image is drawn on the display.

In block 408, it is determined whether rulers are turned on. A user may specify whether or not they want image-centric rulers superimposed on the image. Image-centric rulers may also be used in conjunction with other ruler types. If rulers are not turned on, the process finishes. If rulers are turned on, in block 410, a coordinate conversion is set. The coordinate conversion translates between screen coordinates and image coordinates. The coordinate conversion specifies an image coordinate system (i.e., the image coordinates of the image drawn in block 406) to relate to the screen coordinate system of the display. The coordinate conversion may be handled by a GPU, improving overall performance. The coordinate conversion further allows the system to draw the rulers in image coordinates, simplifying the implementation of the process 400.

In block 412, the position of a pointer relative to the image is determined. According to an embodiment, the rulers extend outward approximately from the position of the pointer, so the position of the pointer is needed to determine where to draw the rulers. In block 414, the pointer coordinates are mapped to image coordinates. When the position of the pointer is determined, an operating system typically returns the position in screen coordinates. The image coordinate values of the pointer can then be determined using the coordinate conversion (see block 410).

In block 416, the current zoom amount applied to the image determined. The current zoom amount can be used, for example, to determine the proper width of the rulers and the proper spacing of the tick marks and reference numbers. This will be explained further below.

In block 418, the tick mark interval is determined. In an embodiment, the tick mark interval changes depending on the current zoom amount. According to an embodiment, the tick marks on the ruler should appear to be approximately the same distance on the screen, regardless of the zoom amount (i.e., the tick marks should have an approximately constant spacing in screen coordinates). For example, if the tick marks are to appear every ten pixels in screen coordinates, and the zoom amount is ten times (10×), the tick marks should be drawn every pixel in image coordinates. The tick mark interval can be computed using the following equation:

$$d = \left\lceil \frac{D}{z} \right\rceil$$

where d is the tick mark interval (in pixels) in image coordinates, D is the desired visible tick mark interval in screen coordinates, and z is the amount of zoom applied to the image (e.g., z=10 for 10× zoom). The brackets indicate that the value inside is rounded up to the next largest integer. The image coordinate interval of the tick marks may be changed for convenience. For example, a user may want the reference numbers on the tick marks to be given in round numbers, such as five or ten pixels in image coordinates. The tick mark interval in screen coordinates can then be changed in the above equation to give a round number for the tick mark interval in image coordinates.

In block 420, the thickness of the ruler is determined. The thickness of the ruler should appear constant in screen coordinates, and since the rulers are drawn using image coordinates, the thickness has to be converted from screen coordinates to image coordinates. The thickness can be determined using the following equation:

$$t = \frac{T}{z}$$

where t is the thickness of the ruler in image coordinates, T is the thickness of the ruler in screen coordinates, and z is the zoom amount of the current view.

In block 422, the ruler is drawn extending outward approximately from the position of the pointer. The process of block 422 is explained further in FIG. 4B. Generally, two segments,
a first segment parallel to an x-axis of the image and a second segment at a fixed angle (e.g., perpendicular) relative to the first segment and parallel to the y-axis of the image are drawn over the image. The segments may be partially transparent to allow a user to see the contents of the image underneath the rulers. Further, the ruler may take one of several different forms, as described above.

In block 424, the tick marks are drawn on the ruler. The tick marks may have an appearance as specified by the user. In some embodiments, the tick marks appear as short lines perpendicular to the edge of the segments of the ruler. In block 426, the reference numbers are drawn near the ruler. In this context, "near" refers to a location, which may be on top of or outside of the ruler that allows a user to determine the value of each tick mark having a reference number. As mentioned above, the reference numbers may be shown in different intervals depending on zoom. For example, at a 1× zoom, reference numbers may be shown for every twenty pixels in image coordinates, while at 10× zoom, reference numbers may be shown for every two pixels in image coordinates, since the higher zoom allows the reference numbers to be legible even though they occur more frequently. Additionally, a pointer position indicator may be drawn near the pointer.

The process 400 may be invoked whenever the screen needs to be updated. In other words, the ruler is redrawn in response to a screen update. For example, the ruler may be redrawn, or moved, in response to detecting a movement of the pointer. This can also be due to any other user action, such as a change in image position, rotation, or zoom, an ongoing animation, or due to change in the actual image contents.

Figure 4B:
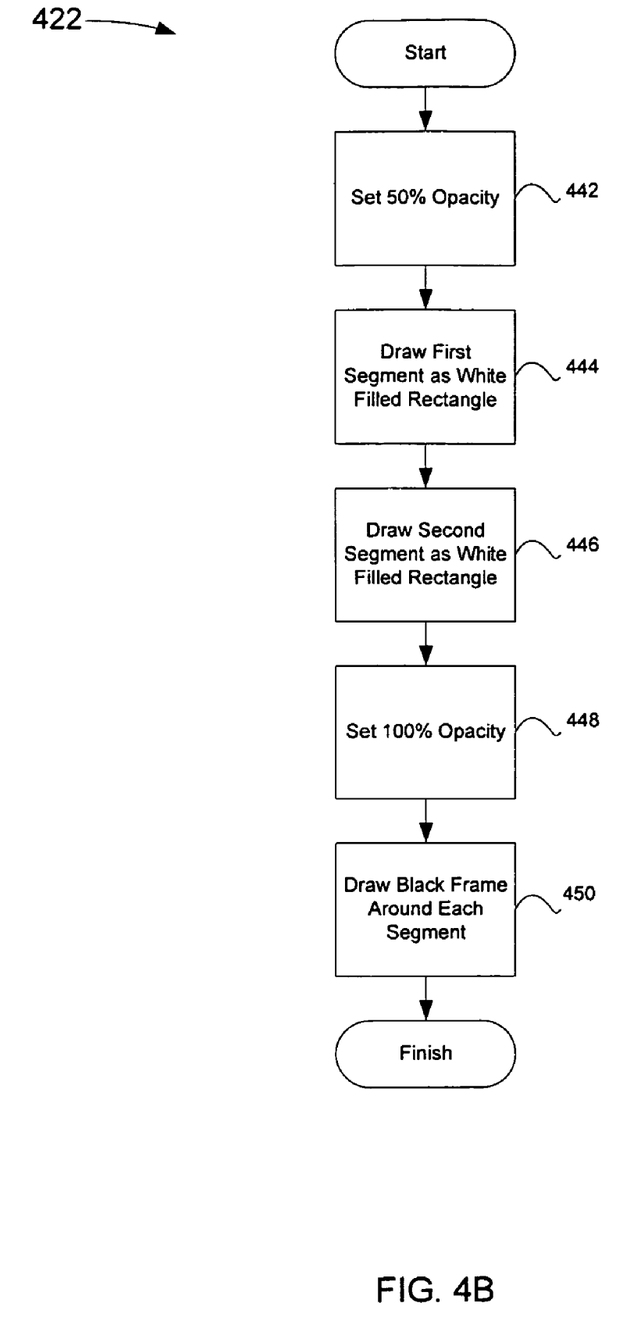
FIG. 4B is a flowchart describing the process of drawing a ruler according to an embodiment.

FIG. 4B is a flowchart describing the process 422 of drawing a ruler according to an embodiment. The process 422 is one possible process for drawing an image-centric ruler, for example, the ruler shown in FIG. 2A. It is understood that various other rulers may be drawn.

In block 442, the opacity of the drawing tool is set to 50% in order to make the rulers partially transparent. Here, "drawing tool" refers to a tool used by a GPU or other device or routine to draw on the display (e.g., a GPU may draw a rectangle or a line). In block 444, the first segment of the ruler is drawn as a white filled rectangle. Since the ruler is drawn over the image, the ruler is drawn in image coordinates to simplify the calculation. The position and dimensions of the rectangle are determined by the position of the pointer and other settings that may be specified. For example, the ruler may be offset from the pointer by a predetermined amount. The thickness of the rectangle was determined in block 420. The width of the rectangle is, according to an embodiment, the length of the image. In block 446, the second segment is drawn as a white filled rectangle at a fixed angle (e.g., perpendicular) to the first segment using the predetermined thickness and the height of the image as the dimensions of the rectangle.

In block 448, the opacity of the drawing tool is set to 100%. In block 450, a black frame is drawn around each segment. The black frame is used to delineate the boundaries of the rulers, making it easier for a user to determine where the rulers are. Although the process 422 is a specific example, it is understood that there are numerous ways to draw a ruler according to various embodiments, and that the process 422 does not limit the appearance of the ruler.

Figure 5:
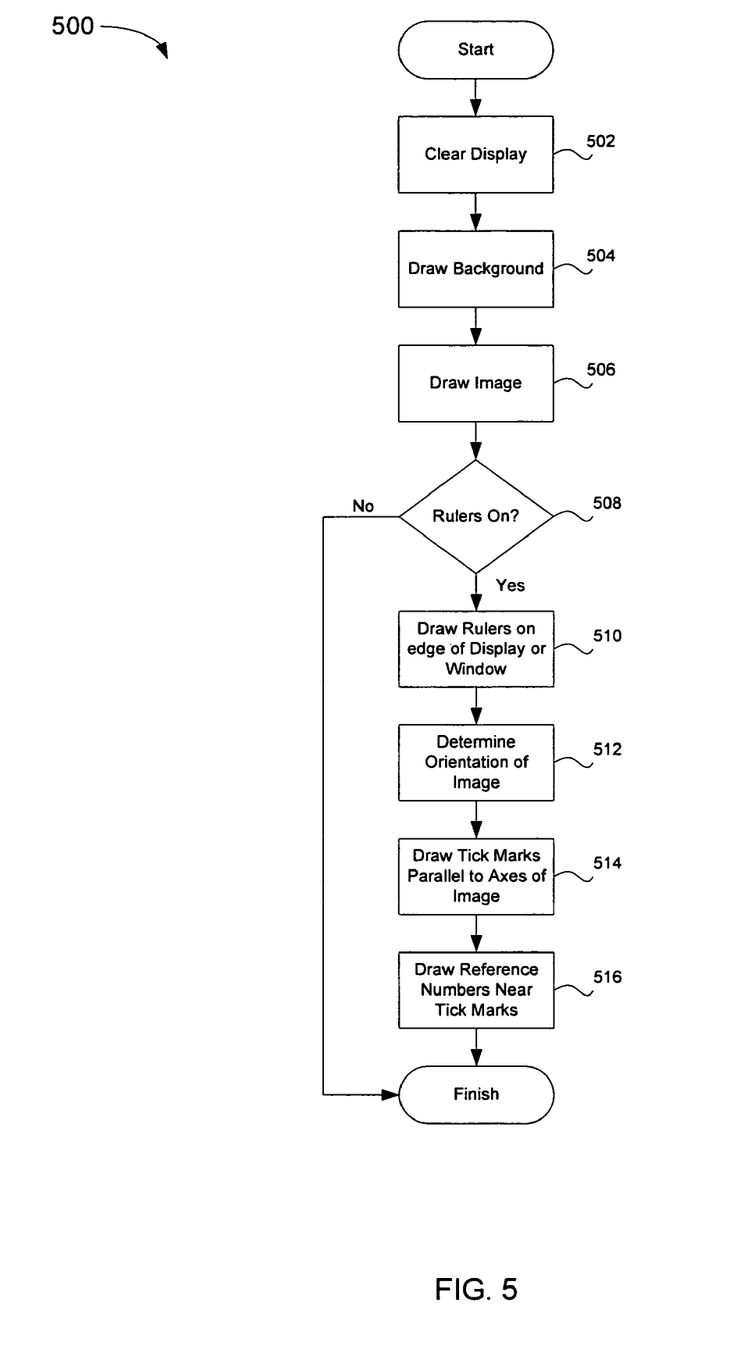
FIG. 5 is a flowchart describing a process for implementing image-oriented tick marks according to an embodiment.

FIG. 5 is a flowchart describing a process 500 for implementing image-oriented tick marks according to an embodiment. The process 500 describes drawing rulers with image-oriented tick marks such as the tick marks 304a and 304b shown in FIGS. 3A and 3B. The tick marks described by the process 500 are parallel with the x- or y-axes of an image to indicate rotation of that image.

In block 502 the display is cleared. In block 504, a background for the display is drawn. In block 506, the image is drawn on the display. When the image is drawn, the various transformations that have been performed are taken into account. For example, a user may have rotated, panned, zoomed, etc. the image, all of which would be shown when the image is drawn.

In block 508, it is determined whether a user has activated the rulers. The user may have chosen to activate a ruler with image-oriented tick marks in addition to or instead of the image-centric rulers described above. In block 510, the rulers are drawn on the edge of a display or window. The rulers with image-oriented tick marks do not move like image-centric rulers, and are drawn at a fixed location regardless of image orientation. Although it is specified that the rulers are drawn at the edge of a display or window, it is understood that the rulers may be located anywhere in relation to the image. Two rulers, for example, one parallel to the x-axis of the display and one parallel to the y-axis of the display, may be drawn.

In block 512, the orientation of the image relative to the display is determined. The orientation may be expressed as an angle of the axes of the image relative to the axes of the display, for example. In block 514, tick marks are drawn parallel to the axes of the image. The tick marks of one ruler may be parallel to one axis of the image and the tick marks of the other ruler may be parallel to the other axis of the image. According to an embodiment, the rulers can switch the axis they are following when the angle of rotation exceeds a certain point. For example, the tick marks in the ruler on the x-axis of the display may follow the x-axis of the image, and then begin following the y-axis of the image when the relative angle of the tick marks and the horizontal ruler edge would become less than 45 degrees if it were not switched. In block 516, reference numbers are drawn near the tick marks. As shown above, in FIGS. 3A and 3B, the reference numbers may move when the image is rotated.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
a computer performing:
    detecting a position of a pointer relative to an image on a display screen;
    drawing a ruler over the image so that the ruler extends outward approximately from the position of the pointer;
    detecting a panning of the image to another location on the display screen, or a rotating of the image relative to the display screen, and in response:
        moving the ruler automatically along with the image to the other location on the display screen if panning of the image is detected, wherein the ruler maintains its position and its orientation relative to the image during the panning of the image; or
        rotating the ruler automatically along with the image if rotating of the image is detected, wherein the ruler maintains its position and its orientation relative to the image during the rotating of the image; and
    moving the ruler so that it follows the pointer in response to detecting movement of the pointer about the display screen, wherein the ruler maintains its orientation relative to orientation of the image as the ruler follows the pointer.

2. The method of claim 1, wherein moving the ruler so that it follows the pointer in response to detecting movement of the pointer about the display screen comprises:
    detecting a new position of the pointer relative to the image; and
    drawing the ruler extending outward approximately from the new position of the pointer, wherein the ruler maintains its orientation relative to orientation of the image.

3. The method of claim 1, wherein drawing the ruler comprises:
    drawing a first segment of the ruler extending outward approximately from the position of the pointer; and
    drawing a second segment of the ruler at a fixed angle relative to the first segment of the ruler extending outward approximately from the position of the pointer.

4. The method of claim 3:
    wherein drawing the first segment of the ruler comprises drawing the first segment of the ruler approximately parallel to an x-axis of the image; and
    wherein drawing the second segment of the ruler comprises drawing the second segment of the ruler approximately parallel to a y-axis of the image.

5. The method of claim 1, further comprising:
    drawing tick marks near the ruler; and
    drawing reference numbers near the tick marks to indicate positions of the tick marks relative to the image.

6. The method of claim 1, further comprising drawing a pointer position indicator near the pointer to indicate the position of the pointer.

7. The method of claim 1, wherein drawing a ruler comprises drawing a ruler at a fixed orientation relative to the image.

8. A method, comprising:
a computer performing:
    determining a position of a pointer relative to an image on a display screen;
    drawing a ruler on the image so that the ruler extends outward approximately from the position of the pointer, and drawing tick marks near the ruler;
    detecting a transformation of the image on the display screen, wherein the transformation of the image produces a change in position or orientation of the image relative to the display screen;
    redrawing the ruler and the tick marks in response to the detecting the transformation of the image, wherein the redrawing changes position or orientation of both the ruler and the tick marks dependent upon a respective change in position or orientation of the image produced by the transformation of the image;
    detecting zooming of the image comprising a change in a zoom amount relative to the display screen, and in response:
        redrawing the image, the ruler, and the tick marks on the display screen, wherein the redrawing applies the detected change in the zoom amount to the image, to the ruler, and to the tick marks; and
        during the zooming of the image:
            automatically maintaining spacing of the tick marks so that distance between the tick marks remains approximately constant relative to the display screen; and
            automatically scaling reference numbers for the tick marks to match the zoom amount.

9. The method of claim 8, wherein drawing a ruler comprises:
   drawing a first segment of the ruler extending outward approximately from the position of the pointer; and
   drawing a second segment of the ruler at a fixed angle relative to the first segment of the ruler extending outward approximately from the position of the pointer.

10. The method of claim 9:
   wherein drawing the first segment of the ruler comprises drawing the first segment of the ruler parallel to an x-axis of the image; and
   wherein drawing the second segment of the ruler comprises drawing the second segment of the ruler parallel to a y-axis of the image.

11. The method of claim 8, further comprising moving the ruler in response to detecting a movement of the pointer.

12. A system, comprising:
   a memory configured to store data associated with an image; and
   a processor configured to perform:
      detecting a position of a pointer relative to the image on a display screen;
      drawing a ruler over the image so that the ruler extends outward approximately from the position of the pointer;
      detecting a panning of the image to another location on the display screen, or a rotating of the image relative to the display screen, and in response:
         moving the ruler automatically along with the image to the other location on the display screen if panning of the image is detected, wherein the ruler maintains its position and its orientation relative to the image during the panning of the image; or
         rotating the ruler automatically along with the image if rotating of the image is detected, wherein the ruler maintains its position and its orientation relative to the image during the rotating of the image; and
      moving the ruler so that it follows the pointer in response to detecting movement of the pointer about the display screen, wherein the ruler maintains its orientation relative to orientation of the image as the ruler follows the pointer.

13. The system of claim 12, wherein moving the ruler so that it follows the pointer in response to detecting movement of the pointer about the display screen comprises:
   detecting a new position of the pointer relative to the image; and
   drawing the ruler extending outward approximately from the new position of the pointer, wherein the ruler maintains its orientation relative to orientation of the image.

14. The system of claim 12, wherein drawing the ruler comprises:
   drawing a first segment of the ruler extending outward approximately from the position of the pointer; and
   drawing a second segment of the ruler approximately at a fixed angle relative to the first segment of the ruler extending outward approximately from the position of the pointer.

15. The system of claim 14:
   wherein drawing the first segment of the ruler comprises drawing the first segment of the ruler approximately parallel to an x-axis of the image; and
   wherein drawing the second segment of the ruler comprises drawing the second segment of the ruler approximately parallel to a y-axis of the image.

16. A computer readable medium storing computer instructions for:
   detecting a position of a pointer relative to an image on a display screen;
   drawing a ruler over the image so that the ruler extends outward approximately from the position of the pointer;
      detecting a panning of the image to another location on the display screen, or a rotating of the image relative to the display screen, and in response:
         moving the ruler automatically along with the image to the other location on the display screen if panning of the image is detected, wherein the ruler maintains its position and its orientation relative to the image during the panning of the image; or
         rotating the ruler automatically along with the image if rotating of the image is detected, wherein the ruler maintains its position and its orientation relative to the image during the rotating of the image; and
   moving the ruler so that it follows the pointer in response to detecting movement of the pointer about the display screen, wherein the ruler maintains its orientation relative to orientation of the image as the ruler follows the pointer.

17. The computer readable medium of claim 16, wherein moving the ruler so that it follows the pointer in response to detecting movement of the pointer about the display screen comprises:
   detecting a new position of the pointer relative to the image; and
   drawing the ruler extending outward approximately from the new position of the pointer, wherein the ruler maintains its orientation relative to orientation of the image.

18. The computer readable medium of claim 16, wherein drawing a ruler comprises:
   drawing a first segment of the ruler extending outward approximately from the position of the pointer; and
   drawing a second segment of the ruler approximately at a fixed angle relative to the first segment of the ruler extending outward approximately from the position of the pointer.

19. The computer readable medium of claim 18:
   wherein drawing the first segment of the ruler comprises drawing the first segment of the ruler approximately parallel to an x-axis of the image; and
   wherein drawing the second segment of the ruler comprises drawing the second segment of the ruler approximately parallel to a y-axis of the image.

* * * * *